United States Patent Office 3,830,904
Patented Aug. 20, 1974

3,830,904
METHOD OF REMOVING FLUORIDE FROM SPENT ACID
William J. Chiasson, and Ralph T. Russell, Lafayette, Ind., assignors to Eli Lilly and Company, Indianapolis, Ind.
No Drawing. Filed May 15, 1972, Ser. No. 253,042
Int. Cl. C01b 17/94
U.S. Cl. 423—531           1 Claim

ABSTRACT OF THE DISCLOSURE

Fluoride, both organic and inorganic, is removed from spent acid derived from a nitric acid-sulfuric acid nitrating mixture from the nitration of p-trifluoromethylphenylchloride by treating said spent acid with a source of silicon at elevated temperatures.

BACKGROUND OF THE INVENTION

Inorganic fluoride has been removed from materials such as phosphoric acid to be used in a phosphate fertilizer by treating the phosphoric acid with silica. The inorganic fluoride ion present is converted to silicon tetrafluoride which is quite volatile and separates from the phosphoric acid upon gentle heating. Fluoride ion is, of course, corrosive in the presence of sulfuric acid and should be removed prior to storage of the recovered acid.

SUMMARY OF THE INVENTION

This invention provides a method for removing fluoride, both organic and inorganic, from a spent acid derived from a nitric acid-sulfuric acid nitrating mixture used in the nitration of p-trifluoromethylphenylchloride, which comprises adding a source of silicon to the spent acid and then heating the resulting mixture to a temperature in the range 150–275° C. While temperatures as low as 70° C. are sufficient to reduce the level of inorganic fluoride to less than 30 p.p.m. if heating is continued for long time periods, temperatures in excess of 150° C. are necessary to remove organic fluoride.

The chemistry of the process step is illustrated by the following equation wherein silicon dioxide is employed as a source of silicon.

(1)   $SiO_2 + 4HF \rightarrow SiF_4\uparrow + 2H_2O$

Silicon tetrafluoride, the product of the above reaction, is volatile under the reaction conditions and in escaping from the reaction mixture takes the fluoride impurity with it. While the invention has been illustrated utilizing silicon dioxide as a source of silicon, other silicon-containing compounds can be used including silica and its hydrates, silica gel, feldspars, kaolinite, anorthosite as well as other complex aluminum, calcium or magnesium silicates.

Silicon tetrafluoride produced according to equation (1) above is fully volatilized at temperatures of 70° C. and above. Thus, at this temperature all inorganic fluoride present will be effectively removed by violatilization. Organic fluoride, however, remains bound to the organic molecule and does not become converted to inorganic fluoride until reaction temperatures of at least 150° C. are reached. At temperatures from 150–275° C., organic fluoride is converted to inorganic fluoride and as previously shown the inorganic fluoride reacts with the silicon source already present to form silicon tetrafluoride according to reaction (1) above. As with other chemical reactions, the length of time of heating varies inversely with the maximum temperature achieved during the reaction, higher temperature necessitating shorter reaction times and vice-versa. Regardless of the temperature employed, heating should be contnued until the level of fluoride, both organic and inorganic is reduced to one which will make the resulting sulfuric acid of suitable quality for reuse either in a nitration procedure or for any other use for which 92–97% sulfuric acid is needed.

The amount of silicon-containing compound added will of course depend upon the amount of fluoride initially present titrated as both inorganic and organic fluoride. A stoichiometric amount or a slight stoichiometric excess can be used depending upon the amount of fluoride, both organic and inorganic, present.

The level of fluoride either as inorganic or organic fluoride encountered in spent acids derived from the nitration with a nitric-sulfuric acid nitration mixture of p-trifluoromethylphenylchloride will vary from 1000–3000 p.p.m. The process of this invention will reduce the level of fluoride to 30 p.p.m. or less.

This invention is further illustrated by the following specific examples.

EXAMPLE 1

500 ml. (about 900 g.) of a spent acid derived from the nitration of p-trifluoromethylphenylchloride had a sulfuric acid content of 91.5% and contained 2700 p.p.m. inorganic fluoride and 400 p.p.m. of organic fluoride. 5 g. of a complex aluminum magnesium silicate (Perlite®) and 55 g. of ammonium sulfate were added. A stream of air was passed over the surface of the acid during the subsequent heating operation. The mixture was heated cautiously to about 220° C. and maintained at the temperature for about 4 hours. The amounts of fluoride at the end of this time had been reduced to the following. 6 p.p.m. inorganic fluoride and 9 p.p.m. organic fluoride. The sulfuric acid content was 97.2%.

EXAMPLE 2

500 ml. (about 900 g.) of a spent acid having the same characteristics as that in Example 1 were treated with 5 g. of a complex aluminum magnesium silicate. The reaction mixture was heated for 6 hours at 150° C. The final level of inorganic fluoride was 5 p.p.m. and organic fluoride 20 p.p.m. Similar results were obtained with an air purge as in Example 1.

We claim:
1. The process for removing organic and inorganic fluoride from a spent acid derived from the nitric-sulfuric acid nitration of p-trifluoromethylphenylchloride which comprises adding a complex aluminum magnesium silicate at the rate of about 1 gram per 100 ml. of spent acid and then heating the resulting mixture in the temperature range 150–275° C. until the level of fluoride, both organic and inorganic totals less than 30 p.p.m.

References Cited
UNITED STATES PATENTS

| | | |
|---|---|---|
| 3,677,701 | 7/1972 | Hollingsworth et al. __423—531 |
| 2,987,376 | 6/1961 | Gloss _____423—341 X |
| 3,674,431 | 7/1972 | Driscoll et al. _____423—341 |

JACK COOPER, Primary Examiner

U.S. Cl. X.R.

423—341